United States Patent
Podjarny et al.

(10) Patent No.: US 9,396,099 B2
(45) Date of Patent: Jul. 19, 2016

(54) APPLICATION STATE DETECTOR AND INDUCER

(75) Inventors: Guy Podjarny, Ottawa (CA); Ariel Sakin, Tel Aviv (IL); Ory Segal, Tel Aviv (IL); Shlomi Shamir, Herzeliya (IL); Adi Sharabani, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 1175 days.

(21) Appl. No.: 12/145,200

(22) Filed: Jun. 24, 2008

(65) Prior Publication Data

US 2009/0320043 A1    Dec. 24, 2009

(51) Int. Cl.
G06F 9/54     (2006.01)
G06F 11/36    (2006.01)

(52) U.S. Cl.
CPC .................. *G06F 11/3688* (2013.01)

(58) Field of Classification Search
None
See application file for complete search history.

(56) References Cited

U.S. PATENT DOCUMENTS

| | | | |
|---|---|---|---|
| 5,297,150 A * | 3/1994 | Clark | 714/26 |
| 5,719,387 A * | 2/1998 | Fujioka | 235/492 |
| 6,262,730 B1 * | 7/2001 | Horvitz et al. | 715/707 |
| 6,349,393 B1 * | 2/2002 | Cox | 714/38.12 |
| 6,549,944 B1 * | 4/2003 | Weinberg et al. | 709/224 |
| 6,996,845 B1 | 2/2006 | Hurst et al. | |
| 7,831,526 B1 * | 11/2010 | Crawford et al. | 706/11 |
| 2002/0186249 A1 | 12/2002 | Lu et al. | |
| 2004/0059809 A1 | 3/2004 | Benedikt et al. | |
| 2005/0022194 A1 * | 1/2005 | Weir et al. | 718/100 |
| 2005/0114353 A1 | 5/2005 | Malik et al. | |
| 2005/0192870 A1 * | 9/2005 | Geddes | 705/26 |
| 2005/0268287 A1 * | 12/2005 | Achlioptas et al. | 717/124 |
| 2006/0069863 A1 * | 3/2006 | Palmer et al. | 711/114 |
| 2006/0101048 A1 * | 5/2006 | Mazzagatti et al. | 707/101 |
| 2007/0169114 A1 * | 7/2007 | Birk Olsen et al. | 717/174 |
| 2007/0226783 A1 | 9/2007 | Mimlitsch | |
| 2008/0256544 A1 * | 10/2008 | Eigler et al. | 718/103 |

* cited by examiner

*Primary Examiner* — Umut Onat
(74) *Attorney, Agent, or Firm* — Sughrue Mion, PLLC.

(57) ABSTRACT

A method for controlling a computer-implemented application, the method including determining a current state of a computer-implemented application, inducing the application into a predefined state associated with a target action of the application if the current state does not match the predefined state in accordance with predefined match criteria, and causing the target action to be performed.

16 Claims, 6 Drawing Sheets

APPLICATION STATE DETECTOR AND INDUCER

FIELD OF THE INVENTION

The present invention relates to the management of computer-based applications in general, and more particularly to automated testing of computer-based applications.

BACKGROUND OF THE INVENTION

Computer-based applications typically require that in order for the application to perform a particular action, a required state must exist, usually as the result of the application performing (e.g., being caused by a user or another application to perform) one or more actions prior to performing the particular action. For example, an application may require that certain variables be initialized before they may be operated upon. While such applications typically enforce an action sequence leading up to each required state, in some circumstances, such as during automated testing of an application, it is desirable to be able to instruct an application to perform an action without regard to the action's required state.

SUMMARY OF THE INVENTION

The present invention in embodiments thereof discloses novel systems and methods for detecting and inducing states of computer-based application.

In one aspect of the present invention a method is provided for controlling a computer-implemented application, the method including determining a current state of a computer-implemented application, inducing the application into a predefined state associated with a target action of the application if the current state does not match the predefined state in accordance with predefined match criteria, and causing the target action to be performed.

In another aspect of the present invention the determining, inducing, and causing steps are performed responsive to detecting a request that the computer-implemented application perform the target action.

In another aspect of the present invention the inducing step includes performing a predefined set of actions of the application whose performance is known to induce the predefined state.

In another aspect of the present invention the performing step includes performing the set of actions in accordance with a predefined sequence.

In another aspect of the present invention the method further includes identifying at least one candidate subset of zero or more actions of the set of actions, where performing the candidate subset of actions produces a result that a) matches a known result of the set of actions in accordance with predefined match criteria, or b) results in a state that matches a predefined state associated with the target action according to predefined match criteria, selecting one of the candidate subsets that includes the fewest number of actions of the candidate subsets, and performing the selected candidate subset responsive to detecting a request that the computer-implemented application perform the target action.

In another aspect of the present invention the method further includes, if a result of the target action matches in accordance with predefined match criteria either a) a known valid result for the target action or b) a result of performing a set of actions of the computer-implemented application associated with the target action followed by the target action, performing the target action responsive to detecting a request that the computer-implemented application perform the target action, otherwise, identifying at least one candidate subset of zero or more actions of the set of actions of the computer-implemented application, where performing the candidate subset of actions followed by the target action produces a result that matches in accordance with predefined match criteria either a) the known valid result for the target action or b) the result of performing the set of actions of the computer-implemented application associated with the target action followed by the target action, selecting one of the candidate subsets that includes the fewest number of actions of the candidate subsets, and performing the selected candidate subset responsive to detecting a request that the computer-implemented application perform the target action.

In another aspect of the present invention a system is provided for controlling a computer-implemented application, the system including a state detector configured to determine a current state of a computer-implemented application, a state inducer configured to induce the application into a predefined state associated with a target action of the application if the current state does not match the predefined state in accordance with predefined match criteria, and a target action manager configured to cause or allow the target action to be performed.

In another aspect of the present invention the state detector, state inducer, and target action manager are operative responsive to the detection of a request that the computer-implemented application perform the target action.

In another aspect of the present invention the state inducer is configured to cause the computer-implemented application to perform a predefined set of actions of the application whose performance is known to induce the predefined state.

In another aspect of the present invention the state inducer is configured to perform the set of actions in accordance with a predefined sequence.

In another aspect of the present invention the system further includes an action set optimizer configured to identify at least one candidate subset of zero or more actions of a set of actions of a computer-implemented application, the set associated with a target action of the application, where performing the candidate subset of actions produces a result that a) matches a known result of the set of actions in accordance with predefined match criteria, or b) results in a state that matches a predefined state associated with the target action according to predefined match criteria, and select one of the candidate subsets that includes the fewest number of actions of the candidate subsets, and where the state inducer is configured to cause the computer-implemented application to perform the selected candidate subset responsive to detecting a request that the computer-implemented application perform the target action.

In another aspect of the present invention the state inducer is operative, if a result of a target action matches in accordance with predefined match criteria either a) a known valid result for the target action or b) a result of performing a set of actions of the computer-implemented application associated with the target action followed by the target action, to cause the computer-implemented application to perform the target action responsive to the detection of a request that the computer-implemented application perform the target action, and further includes an action set optimizer configured to identify at least one candidate subset of zero or more actions of the set of actions of the computer-implemented application, where performing the candidate subset of actions followed by the target action produces a result that matches in accordance with predefined match criteria either a) the known valid result for the target action or b) the result of performing the set of actions of the computer-implemented application associated with the target action followed by the target action, select one of the candidate subsets that includes the fewest number of actions of the candidate subsets, and perform the selected candidate subset responsive to detecting a request that the computer-implemented application perform the target action, if a the result of the target action does not match the known valid result for the target action or the result of performing the set of actions.

In another aspect of the present invention a computer-implemented program is provided embodied on a computer-readable medium, the computer program including a code segment operative to determine a current state of a computer-implemented application, a code segment operative to induce the application into a predefined state associated with a target action of the application if the current state does not match the predefined state in accordance with predefined match criteria, and a code segment operative to cause the target action to be performed.

In another aspect of the present invention the code segments are operative responsive to detecting a request that the computer-implemented application perform the target action.

In another aspect of the present invention the code segment operative to induce is operative to perform a predefined set of actions of the application whose performance is known to induce the predefined state.

In another aspect of the present invention the code segment operative to induce is operative to perform the set of actions in accordance with a predefined sequence.

In another aspect of the present invention the computer program further includes a code segment operative to identify at least one candidate subset of zero or more actions of the set of actions, where performing the candidate subset of actions produces a result that a) matches a known result of the set of actions in accordance with predefined match criteria, or b) results in a state that matches a predefined state associated with the target action according to predefined match criteria, a code segment operative to select one of the candidate subsets that includes the fewest number of actions of the candidate subsets, and a code segment operative to perform the selected candidate subset responsive to detecting a request that the computer-implemented application perform the target action.

In another aspect of the present invention the computer program further includes a code segment operative, if a result of the target action matches in accordance with predefined match criteria either a) a known valid result for the target action or b) a result of performing a set of actions of the computer-implemented application associated with the target action followed by the target action, to perform the target action responsive to detecting a request that the computer-implemented application perform the target action, and otherwise operative to identify at least one candidate subset of zero or more actions of the set of actions of the computer-implemented application, where performing the candidate subset of actions followed by the target action produces a result that matches in accordance with predefined match criteria either a) the known valid result for the target action or b) the result of performing the set of actions of the computer-implemented application associated with the target action followed by the target action, select one of the candidate subsets that includes the fewest number of actions of the candidate subsets, and perform the selected candidate subset responsive to detecting a request that the computer-implemented application perform the target action.

BRIEF DESCRIPTION OF THE DRAWINGS

The present invention in embodiments thereof will be understood and appreciated more fully from the following detailed description taken in conjunction with the appended drawings in which.

DETAILED DESCRIPTION OF THE INVENTION

Figure 1:
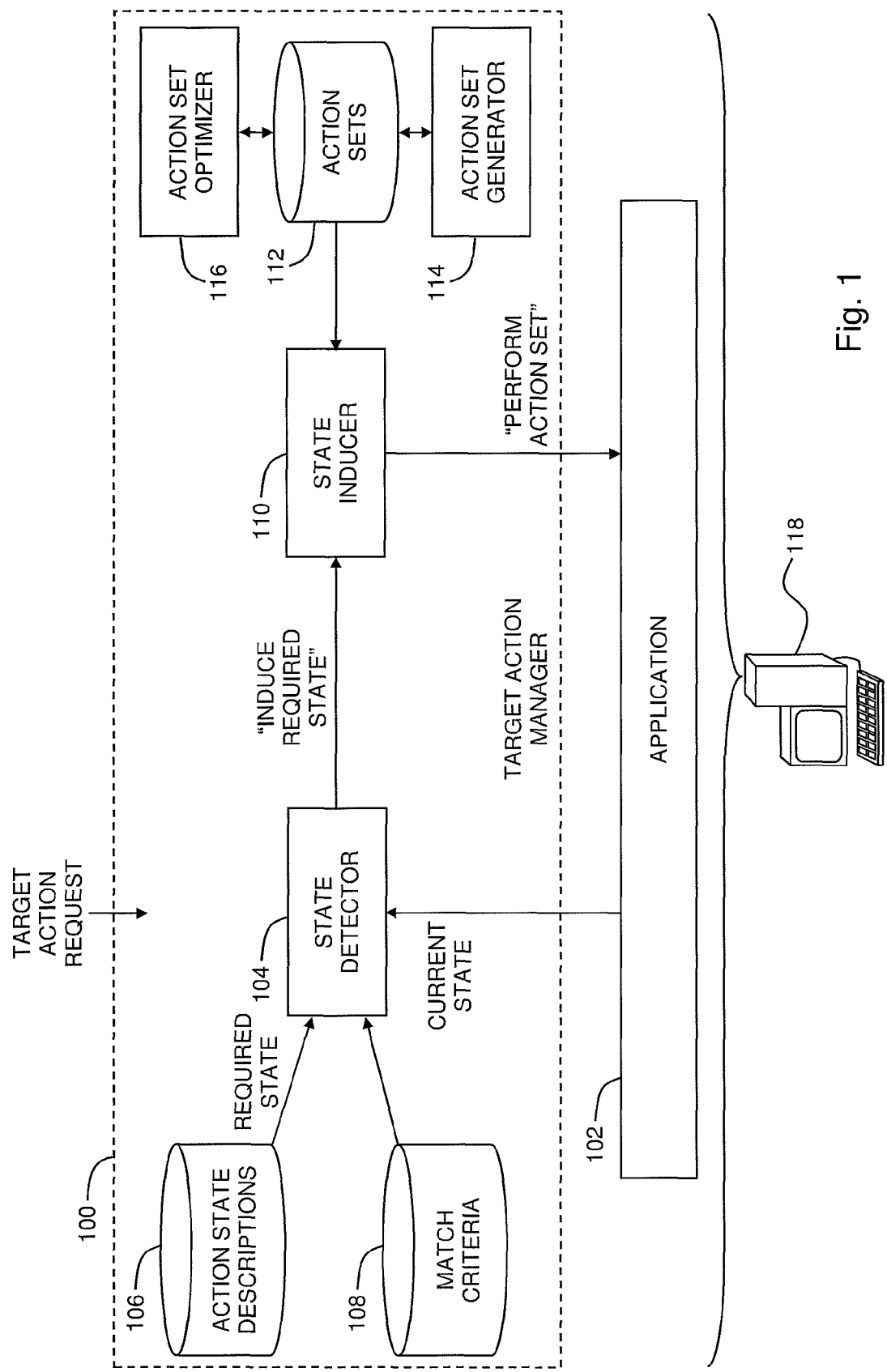
FIG. 1 is a simplified illustration of a system for detecting and inducing application states, constructed and operative in accordance with an embodiment of the present invention.

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java®, Smalltalk®, C++ or the like and conventional procedural programming languages, such as the "C" programming language or similar programming languages. The program code may execute' entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Reference is now made to FIG. 1, which is a simplified illustration of a system for detecting and inducing application states, constructed and operative in accordance with an embodiment of the present invention. In one embodiment the system of FIG. 1 is used in conjunction with an automated application testing system, such as the AppScan® system, commercially available from International Business Machines Corporation, Armonk, N.Y., that performs automated testing of World Wide Web-based applications. In the system of FIG. 1, a target action manager 100 receives or otherwise detects a request to perform a target action within a computer-based application 102. Prior to application 102 performing the target action, a state detector 104 determines if the requested target action requires that a predefined state first exist for application 102 before the target action may be performed. In one embodiment a description of the required predefined state is stored in a table 106 of action state descriptions that state detector 104 consults. State detector 104 compares the current state, such as may be retrieved from application 102, with the predefined state required by the target action to determine if they match, such as in accordance with predefined match criteria 108. If the current state does not match the predefined state, a state inducer 110 preferably induces the required state, such as by causing application 102 to perform a set of actions. In one embodiment the set of actions whose performance are required to induce the state are stored in a set 112 of action sets, with each action set in set 112 preferably being associated with a target action and known to induce the state required by the target action. An action set may also include a sequence in which the actions are to be performed. Once the required state has been induced, target action manager 100 causes or otherwise allows the target action to be performed by application 102.

The system of FIG. 1 may be understood by way of example, such as where a requested target action is performing a shopping cart checkout at a checkout web page of an e-commerce application. A predefined state that is required before the checkout is performed is defined in action state description table 106 as a user being logged in to the e-commerce application, and at least one item being present in the shopping cart, and match criteria 108 require that both be true. The current state as determined by state detector 104, however, indicates that no user is currently logged in to the e-commerce application, and no item is present in the shopping cart. State inducer 110 then accesses action set table 112 to identify the action set that is associated with the target action being requested. The action set includes logging a user into a login web page and placing one or more items into a shopping cart on an item selection web page. State inducer 112 then causes application 102 to perform the actions in the action set, whereupon target action manager 100 causes or otherwise allows the target action to be performed by application 102.

In one embodiment a manual identification is performed of each target action within application 102, its predefined state that must first exist for application 102 before the target action may be performed, and the actions or action sequence required to effect the predefined state. In an alternative embodiment the system of FIG. 1 includes an action set generator 114 that automatically generates action sets. An exemplary method for automatically generating action sets is described hereinbelow with reference to FIG. 3.

In one embodiment the system of FIG. 1 includes an action set optimizer 116 that optimizes any of the action sets in action set table 112. An exemplary method for optimizing action sets is described hereinbelow with reference to FIG. 4.

In one embodiment any of the elements shown in FIG. 1 are executed by or otherwise accessible to a computer 118, such as by implementing any of the elements shown in FIG. 1 in computer hardware and/or in computer software embodied in a computer-readable medium in accordance with conventional techniques.

Figure 2:
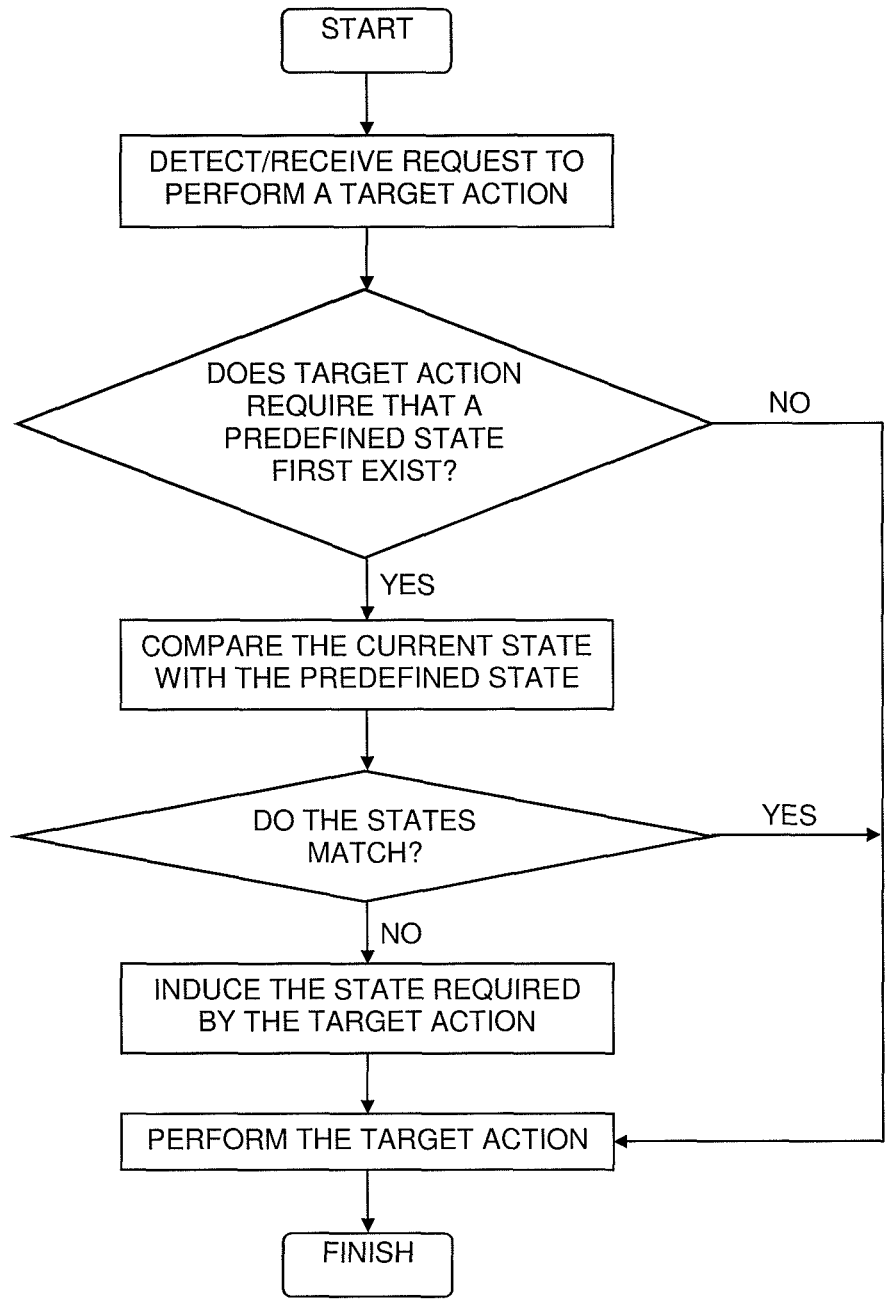
FIG. 2 is a simplified conceptual illustration of an exemplary method of operation of the system of FIG. 1, operative in accordance with an embodiment of the invention.

Reference is now made to FIG. 2 which is a simplified conceptual illustration of an exemplary method of operation of the system of FIG. 1, operative in accordance with an embodiment of the invention. In the method of FIG. 2, a request to perform a target action within a computer-based application is received or otherwise detected. Prior to the application performing the target action, if the requested target action requires that a predefined state first exist for the application, the current state of the application is compared with the predefined state. If the current state does not match the predefined state, the application is caused to perform a set of actions that are associated with the target action and known to induce the state required by the target action. Once the required state has been induced, the application is caused or otherwise allowed to perform the target action.

Figure 3:
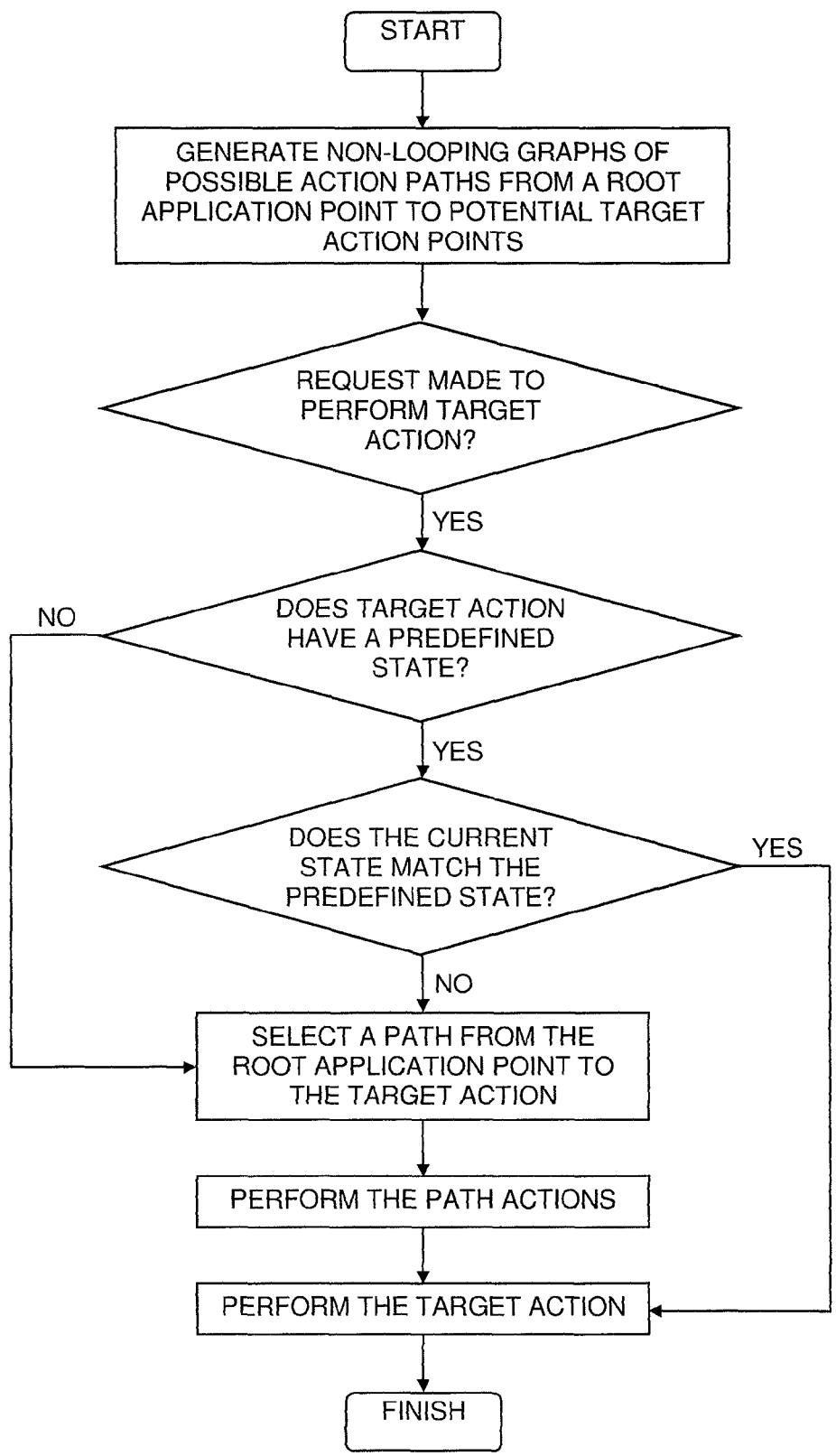
FIG. 3 is an exemplary method for automatically generating action sets, operative in accordance with an embodiment of the invention.

Reference is now made to FIG. 3 which is a simplified conceptual illustration of a method for automatically generating action sets, operative in accordance with an embodiment of the invention. In the method of FIG. 3, action sets are automatically generated by generating non-looping graphs of possible action paths from a root application point, such as a start-up procedure that an application invokes when the application is executed, to one or more potential target action points within the application. When a request is made to perform a target action, if the current state of the application does not match a predefined state as described above, or if no predefined state exists for the target action, a path from the root application point to the target action is selected, preferably being the path between the two points having the fewest actions. The set of actions that lie along the selected path up to the target action are then performed prior to performing the target action as described hereinabove.

Figure 4A:
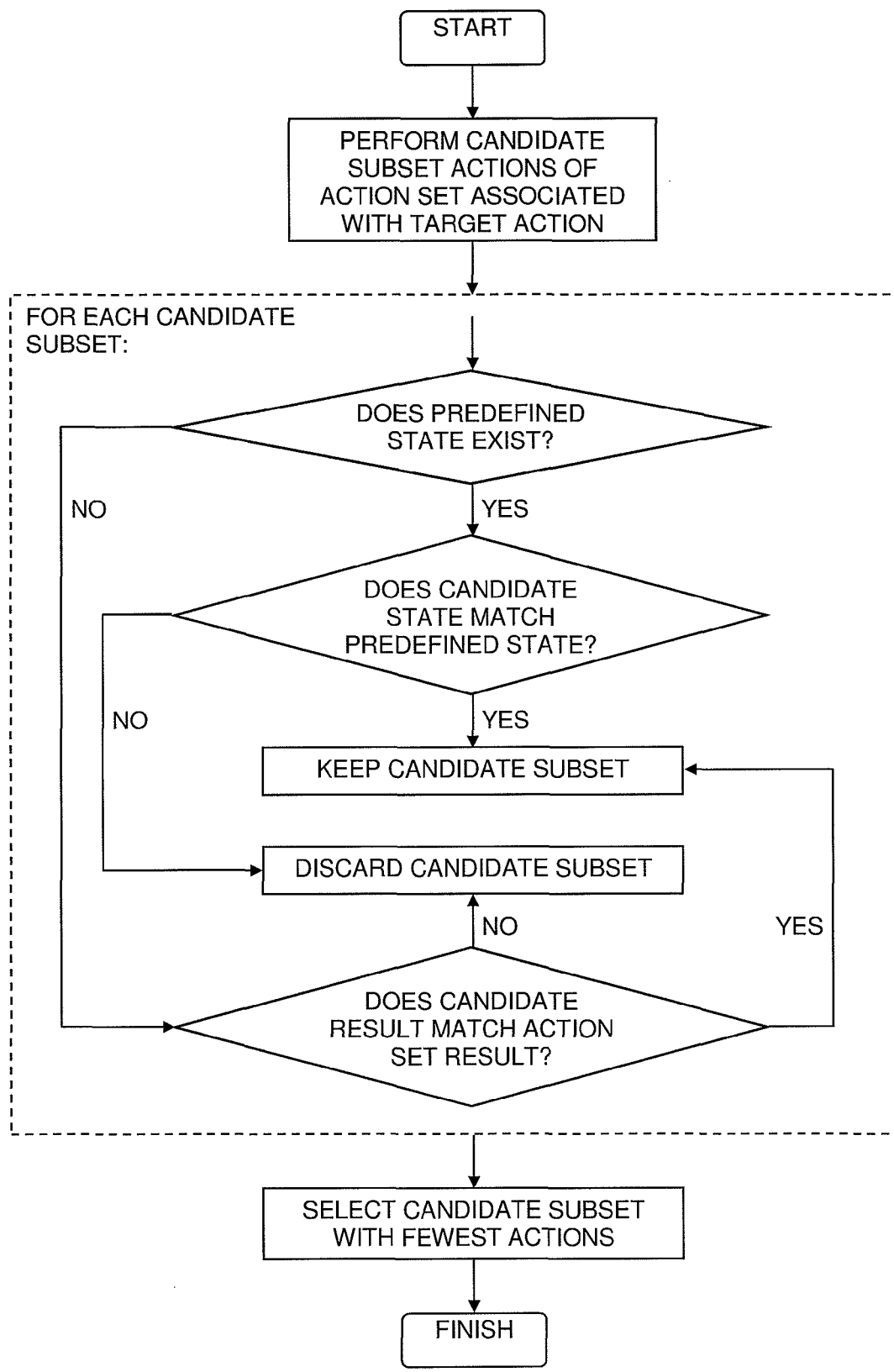
FIGS. 4A and 4B are simplified conceptual illustrations of methods for optimizing action sets, operative in accordance with an embodiment of the invention.
Figure 4B:
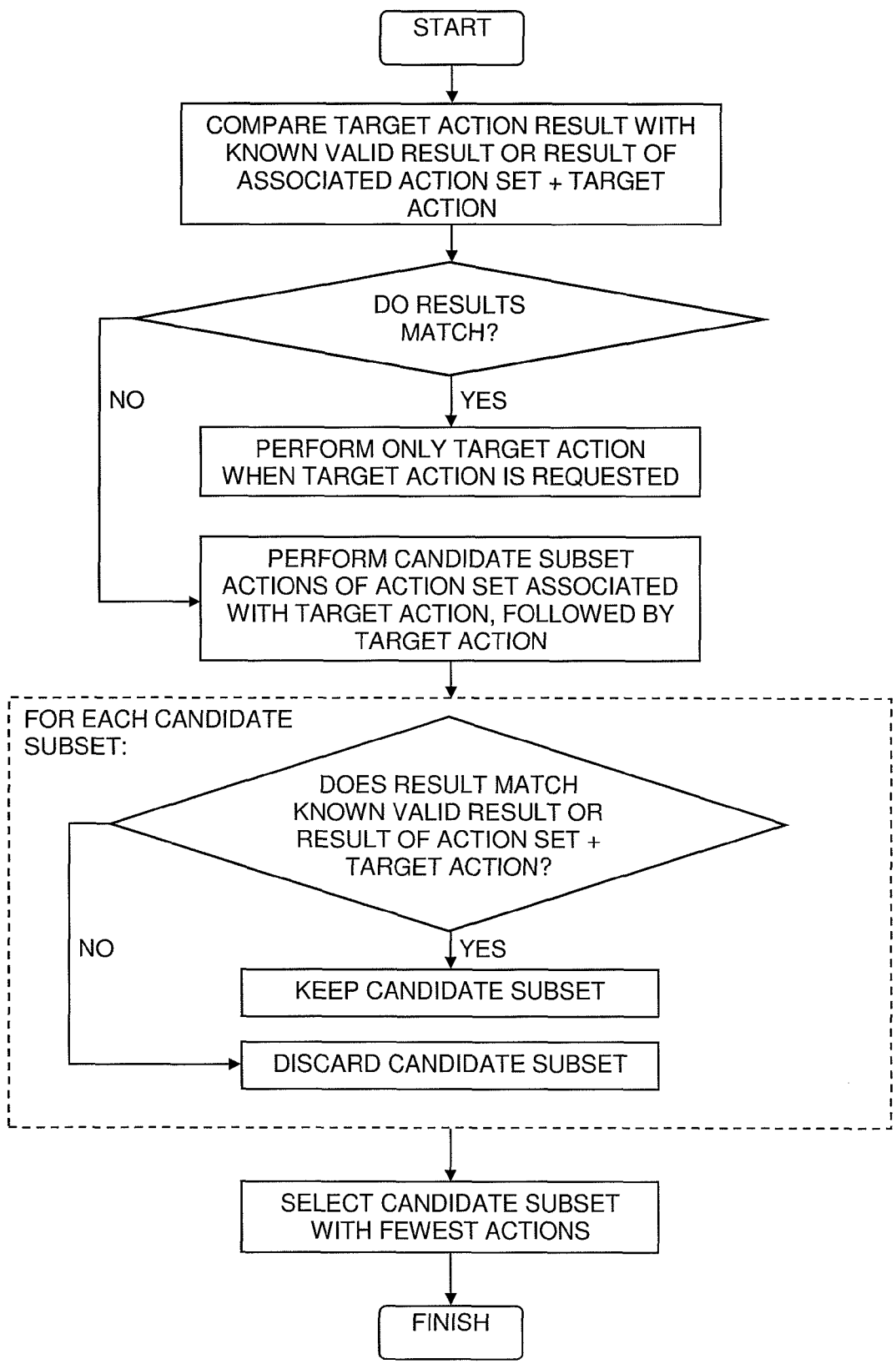

Reference is now made to FIGS. 4A and 4B which are simplified conceptual illustrations of methods for optimizing action sets, operative in accordance with an embodiment of the invention. In the method of FIG. 4A, a given action set for a given target action may be optimized by performing different candidate subsets of zero or more members of the action set. For example, if a sequence is defined for the action set, the action immediately preceding the target action may be performed to form one candidate subset, the two actions preceding the target action may be performed to form another candidate subset, and so on. The candidate subset with the fewest actions that produces a result that matches the result of the entire action set according to predefined match criteria, or that results in a state that matches a predefined state associated with the target action according to predefined match criteria, may then be selected. When a request is subsequently detected to perform the target action, only the actions in the selected subset need be performed prior to performing the target action.

Alternatively, as shown in the method of FIG. 4B, the target action itself may be performed and its result compared with either a known valid result for the target action or with the result of performing the entire action set followed by the target action. If the results match according to predefined match criteria, when a request is subsequently detected to perform the target action, only the target action need be performed. If the results do not match according to predefined match criteria, different candidate subsets of zero or more members of the action set may be performed as described above, followed by the target action. The candidate subset with the fewest actions followed by the target action that produces a result that matches a known valid result for the target action or the result of the entire action set followed by the target action according to predefined match criteria may then be selected. When a request is subsequently detected to perform the target action, only the actions in the selected subset need be performed prior to performing the target action.

Figure 5:
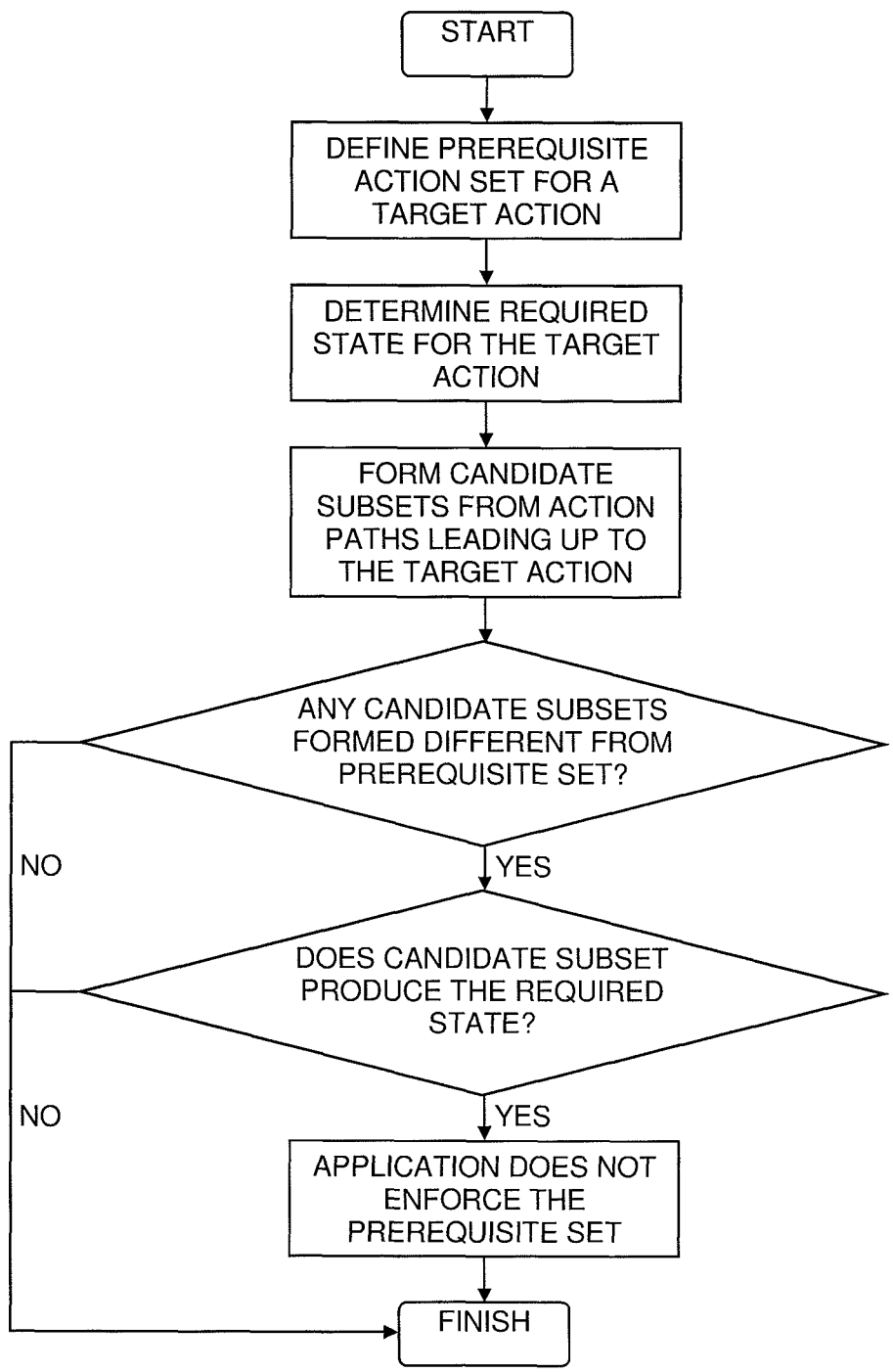
FIG. 5 is a simplified conceptual illustration of a method for testing application flow enforcement, operative in accordance with an embodiment of the invention.

Reference is now made to FIG. 5 which is a simplified conceptual illustration of a method for testing application flow enforcement, operative in accordance with an embodiment of the invention. A prerequisite action set may be defined (with or without a sequence) for a target action in an application requiring that the target action only be performed if it is preceded by the performance of the prerequisite action set. The present invention may be used to test whether such an application is indeed enforcing the prerequisite actions requirement, or whether the target action may be performed in the correct state even when the target action is not preceded by the performance of the prerequisite actions. In the method of FIG. 5, given a target action and a prerequisite action set for the target action, and given either a predefined required state for the target action or performing the prerequisite action set to determine the required state that exists prior to performing the target action, one or more candidate subsets are formed of zero or more actions of any action path leading up to the target action. If at least one such candidate subset can be formed that differs from the prerequisite action set, and/or if performing the actions of such a candidate subset produces the target action's required state, the application is said to not enforce the prerequisite action set.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

What is claimed is:

1. A method implemented by a computer for controlling a computer-implemented application for automated testing of the application, the method comprising:
   determining, by the computer, a current state of the computer-implemented application;
   determining, by the computer, a prerequisite action set for a target action, wherein the action set is a sequence in which a plurality of actions are performed and is generated by generating non- looping graphs of possible action paths;
   inducing, by the computer, said application into a predefined state associated with the target action of said application if said current state does not match said predefined state in accordance with predefined match criteria;

selecting, by the computer, a path from a root application point to the target action having the fewest number of actions needed to perform the target action wherein the selected path comprises a subset of actions from a set of actions, wherein the subset of actions will induce the predefined state without using two or more actions included in the prerequisite action set;

implementing, by the computer, the subset;

causing, by the computer, said target action to be performed;

identifying, by the computer, at least one candidate subset of zero or more actions of said set of actions, wherein performing said candidate subset of actions produces a state that matches a predefined state associated with said target action according to the predefined match criteria;

selecting, by the computer, one of said candidate subsets that includes the fewest number of actions of said candidate subsets; and performing, by the computer, said selected candidate subset responsive to detecting a request that said computer-implemented application perform said target action;

wherein if the identified candidate subset differs from the prerequisite action set, and the candidate subset produces the predefined state, it is determined that said computer-implemented application does not enforce the prerequisite action set.

2. The method according to claim 1 wherein said determining the current state, inducing, and causing steps are performed responsive to detecting, by the computer, a request that said computer-implemented application perform said target action.

3. The method according to claim 1 wherein said inducing step comprises performing, by the computer, a predefined set of actions of said application whose performance is known to induce said predefined state.

4. The method according to claim 3 wherein said performing step comprises performing, by the computer, said set of actions in accordance with a predefined sequence.

5. The method according to claim 1, wherein:
selecting, by the computer, the path from the root application point to the target action having the fewest number of actions needed to perform the target action is performed without using any of the actions included in the prerequisite action set.

6. A system for controlling a computer-implemented application for automated testing of the application, the system comprising:
a processor and a memory;
a state detector configured to determine a current state of the computer-implemented application;
a determiner configured to determine a prerequisite action set for a target action, wherein the action set is a sequence in which a plurality of actions are performed and is generated by generating non-looping graphs of possible action paths;
a state inducer configured to induce said application into a predefined state associated with a target action of said application if said current state does not match said predefined state in accordance with predefined match criteria;
a selector configured to select a path from a root application point to the target action having the fewest number of actions needed to perform the target action wherein the selected path comprises a subset of actions from a set of actions, wherein the subset of actions will induce the predefined state without using two or more actions included in the prerequisite action set;
an implementer configured to implement the subset;
a target action manager configured to cause or allow said target action to be performed; and
an action set optimizer configured to:
identify at least one candidate subset of zero or more actions of a set of actions of said computer-implemented application, said set associated with a target action of said application, wherein performing said candidate subset of actions produces a result that results in a state that matches a predefined state associated with said target action according to the predefined match criteria, and
select one of said candidate subsets that includes the fewest number of actions of said candidate subsets, and
wherein said state inducer is configured to cause said computer-implemented application to perform said selected candidate subset responsive to detecting a request that said computer-implemented application perform said target action; and
wherein if the identified candidate subset differs from the prerequisite action set, and the candidate subset produces the predefined state, it is determined that said computer-implemented application does not enforce the prerequisite action set.

7. The system according to claim 6 wherein said state detector, state inducer, and target action manager are operative responsive to the detection of a request that said computer-implemented application perform said target action.

8. The system according to claim 6 wherein said state inducer is configured to cause said computer-implemented application to perform a predefined set of actions of said application whose performance is known to induce said predefined state.

9. The system according to claim 8 wherein said state inducer is configured to perform said set of actions in accordance with a predefined sequence.

10. The system according to claim 6, wherein:
the selector is configured to select the path from the root application point to the target action having the fewest number of actions needed to perform the target action without using any of the actions included in the prerequisite action set.

11. A computer program product for automated testing of an application, the computer program product comprising a non-transitory computer-readable medium having program instructions embodied therewith, the program instructions executable by a device to cause the device to:
determine a current state of a computer-implemented application;
determine a prerequisite action set for a target action, wherein the action set is a sequence in which a plurality of actions are performed and is generated by generating non-looping graphs of possible action paths;
induce said application into a predefined state associated with a target action of said application if said current state does not match said predefined state in accordance with predefined match criteria;
select a path from a root application point to the target action having the fewest number of actions needed to perform the target action wherein the selected path comprises a subset of actions from a set of actions, wherein the subset of actions will induce the predefined state without using two or more actions included in the prerequisite action set;
implement the subset;
cause said target action to be performed;

identify at least one candidate subset of zero or more actions of said set of actions, wherein performing said candidate subset of actions produces a result that a) matches a known result of said set of actions in accordance with the predefined match criteria, or b) results in a state that matches a predefined state associated with said target action according to the predefined match criteria;

select one of said candidate subsets that includes the fewest number of actions of said candidate subsets; and perform said selected candidate subset responsive to detecting a request that said computer-implemented application perform said target action;

wherein if the identified candidate subset differs from the prerequisite action set, and the candidate subset produces the predefined state, the program instructions cause the device to determine that said computer-implemented application does not enforce the prerequisite action set.

12. The computer program according to claim 11 wherein the program instructions to cause the device to determine the current state, to induce, and to cause are operative responsive to detecting a request that said computer-implemented application perform said target action.

13. The computer program according to claim 11 wherein the program instructions to cause the device to induce is operative to perform a predefined set of actions of said application whose performance is known to induce said predefined state.

14. The computer program according to claim 13 wherein the program instructions to cause the device to induce is operative to perform said set of actions in accordance with a predefined sequence.

15. The computer program according to claim 11, wherein:
the program instructions to cause the device to select a path from the root application point to the target action having the fewest number of actions needed to perform the target action performs the selection without using any of the actions included in the prerequisite action set.

16. A method, implemented by a computer, for controlling a computer-implemented application for automated testing of the application, the method comprising:

determining, by the computer, a current state of the computer-implemented application;

determining, by the computer, a prerequisite action set for a target action, wherein the action set is a sequence in which a plurality of actions are performed and is generated by generating non-looping graphs of possible action paths;

inducing, by the computer, said application into a predefined state associated with the target action of said application if said current state does not match said predefined state in accordance with predefined match criteria;

selecting, by the computer, a path from a root application point to the target action having the fewest number of actions needed to perform the target action wherein the selected path comprises a subset of actions from a set of actions, wherein the subset of actions will induce the predefined state without using two or more actions included in the prerequisite action set;

implementing, by the computer, the subset;

causing, by the computer, said target action to be performed;

identifying, by the computer, at least one candidate subset of zero or more actions of said set of actions, wherein performing said candidate subset of actions produces a result that matches a known result of said set of actions in accordance with the predefined match criteria;

selecting, by the computer, one of said candidate subsets that includes the fewest number of actions of said candidate subsets; and performing, by the computer, said selected candidate subset responsive to detecting a request that said computer-implemented application perform said target action;

wherein if the identified candidate subset differs from the prerequisite action set, and the candidate subset produces the predefined state, it is determined that said computer-implemented application does not enforce the prerequisite action set.

\* \* \* \* \*